United States Patent [19]
Baker et al.

[11] Patent Number: 5,567,334
[45] Date of Patent: Oct. 22, 1996

[54] METHOD FOR CREATING A DIGITAL MICROMIRROR DEVICE USING AN ALUMINUM HARD MASK

[75] Inventors: James C. Baker, Coppell; Henry Trombley, Princeton; Scott H. Prengle, Plano, all of Tex.

[73] Assignee: Texas Instruments Incorporated, Dallas, Tex.

[21] Appl. No.: 396,024

[22] Filed: Feb. 27, 1995

[51] Int. Cl.$^6$ .................................. B44C 1/22; C23F 1/00
[52] U.S. Cl. .................................. 216/24; 216/41; 216/67; 216/77
[58] Field of Search .................................. 216/2, 14, 24, 216/75, 77, 67, 41; 359/223, 291, 224, 230, 226

[56] References Cited

U.S. PATENT DOCUMENTS

| | | | |
|---|---|---|---|
| 4,566,935 | 1/1986 | Hornbeck | 156/626 |
| 5,018,256 | 5/1991 | Hornbeck | 29/25.01 |
| 5,041,851 | 8/1991 | Nelson | 346/160 |
| 5,061,049 | 10/1991 | Hornbeck | 359/224 |
| 5,083,857 | 1/1992 | Hornbeck | 359/291 |
| 5,096,279 | 3/1992 | Hornbeck | 359/230 |
| 5,101,236 | 3/1992 | Nelson et al. | 355/229 |
| 5,142,405 | 8/1992 | Hornbeck | 359/226 |
| 5,206,629 | 4/1993 | DeMond et al. | 340/719 |
| 5,285,196 | 2/1994 | Gale, Jr. | 345/108 |
| 5,312,513 | 5/1994 | Florence et al. | 216/24 |

Primary Examiner—William Powell
Attorney, Agent, or Firm—Robert C. Klinger; James C. Kesterson; Richard L. Donaldson

[57] ABSTRACT

A method for fabricating a DMD spatial light modulator (10, 66) using an aluminum hard mask (40,50,80,90). The DMD superstructure (14,16) is comprised entirely of titanium tungsten (TiW), whereby the hinge (14) and beam (16) are patterned by a respective thin aluminum hard mask. A very rigid superstructure (14,16) is achieved, and the use of a sacrificial oxide hard mask is avoided. With the thin aluminum hard mask (40,80), good step coverage of subsequent layers is achieved. Relatively few semiconductor processing steps are required, with the titanium tungsten layers (32,44, 72,84) being etched away with a fluorinated plasma. In one embodiment, the photoresist spacer layer (30) is never exposed to a fluorinated plasma.

29 Claims, 9 Drawing Sheets

FIG. 1
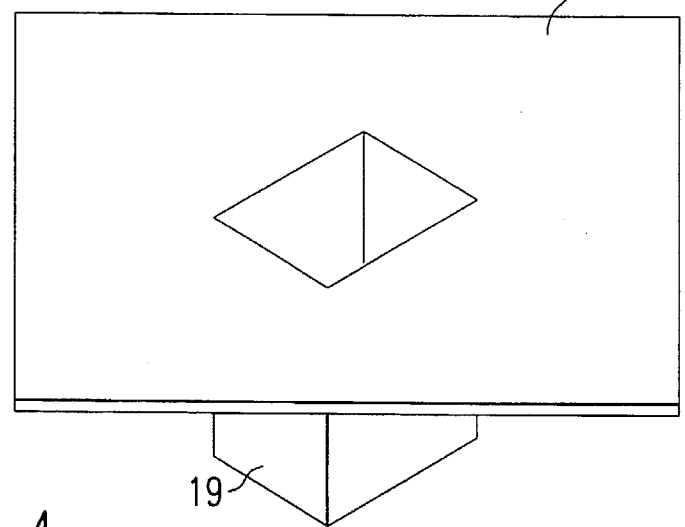
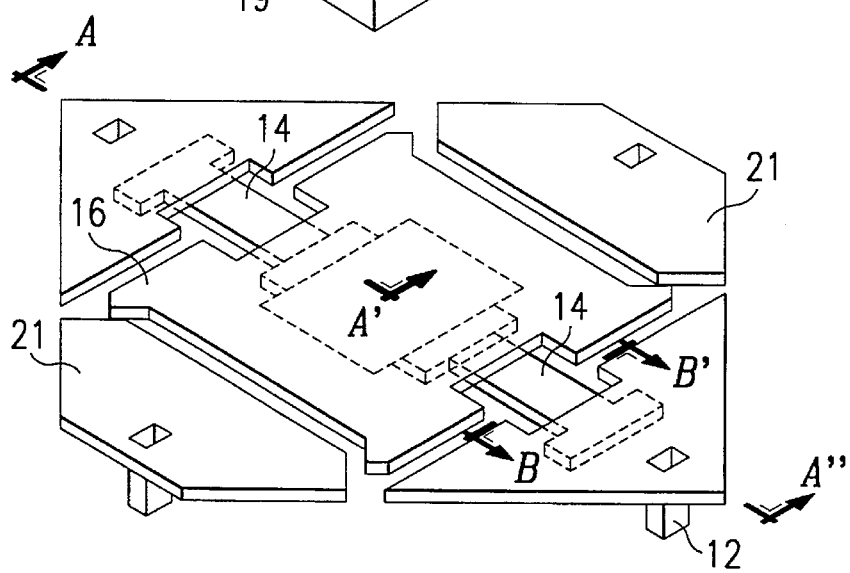
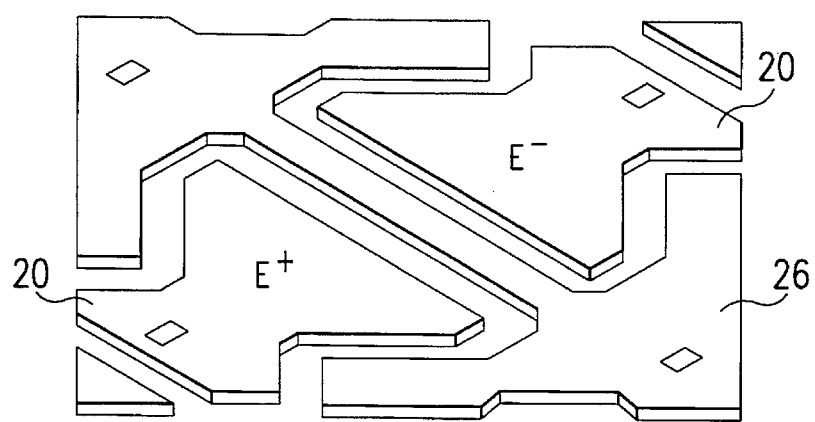

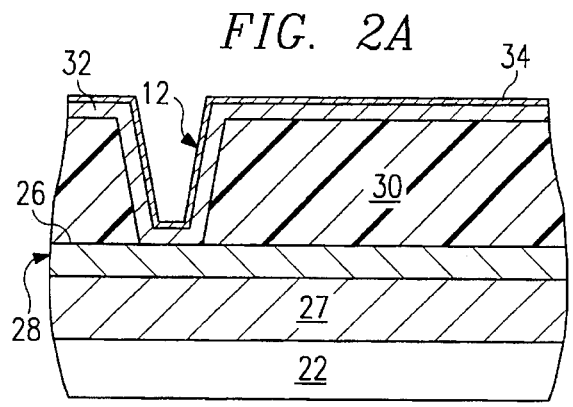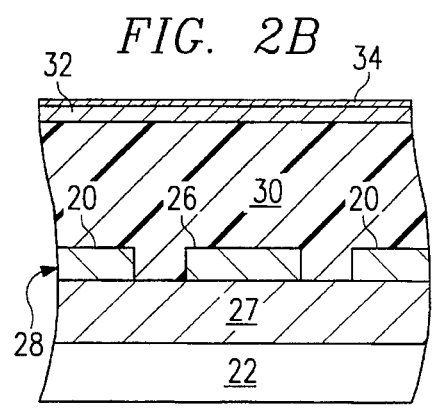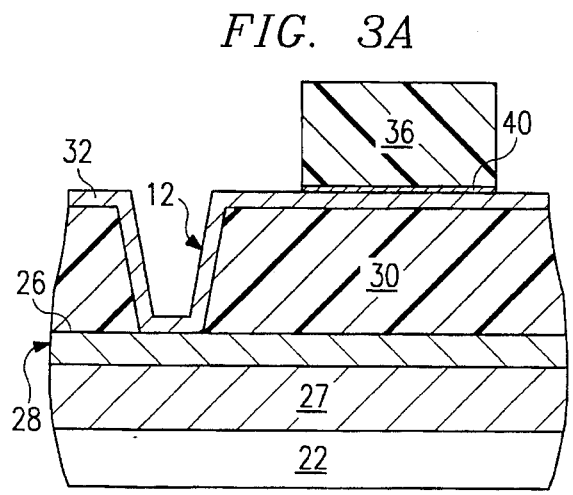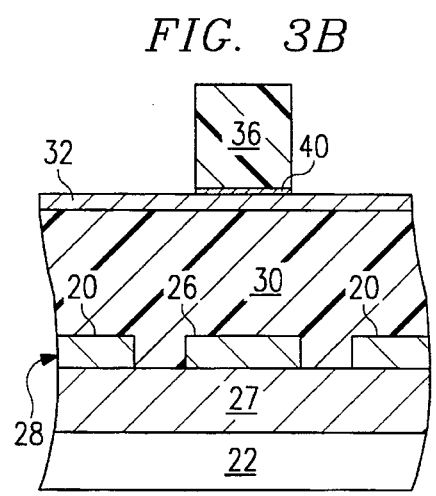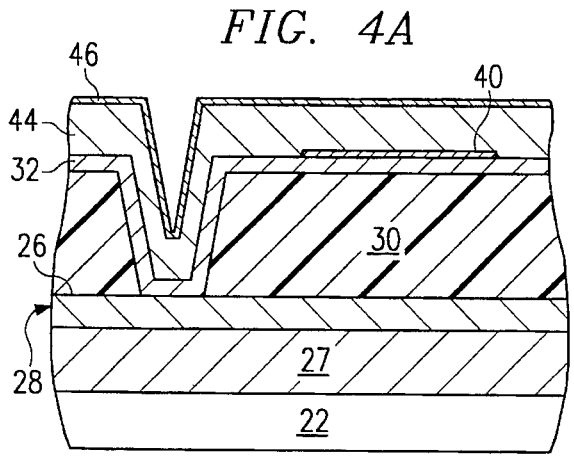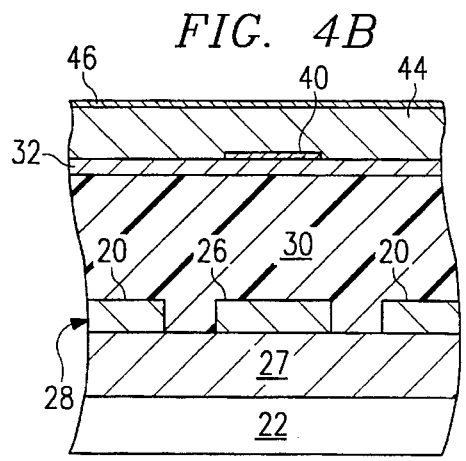

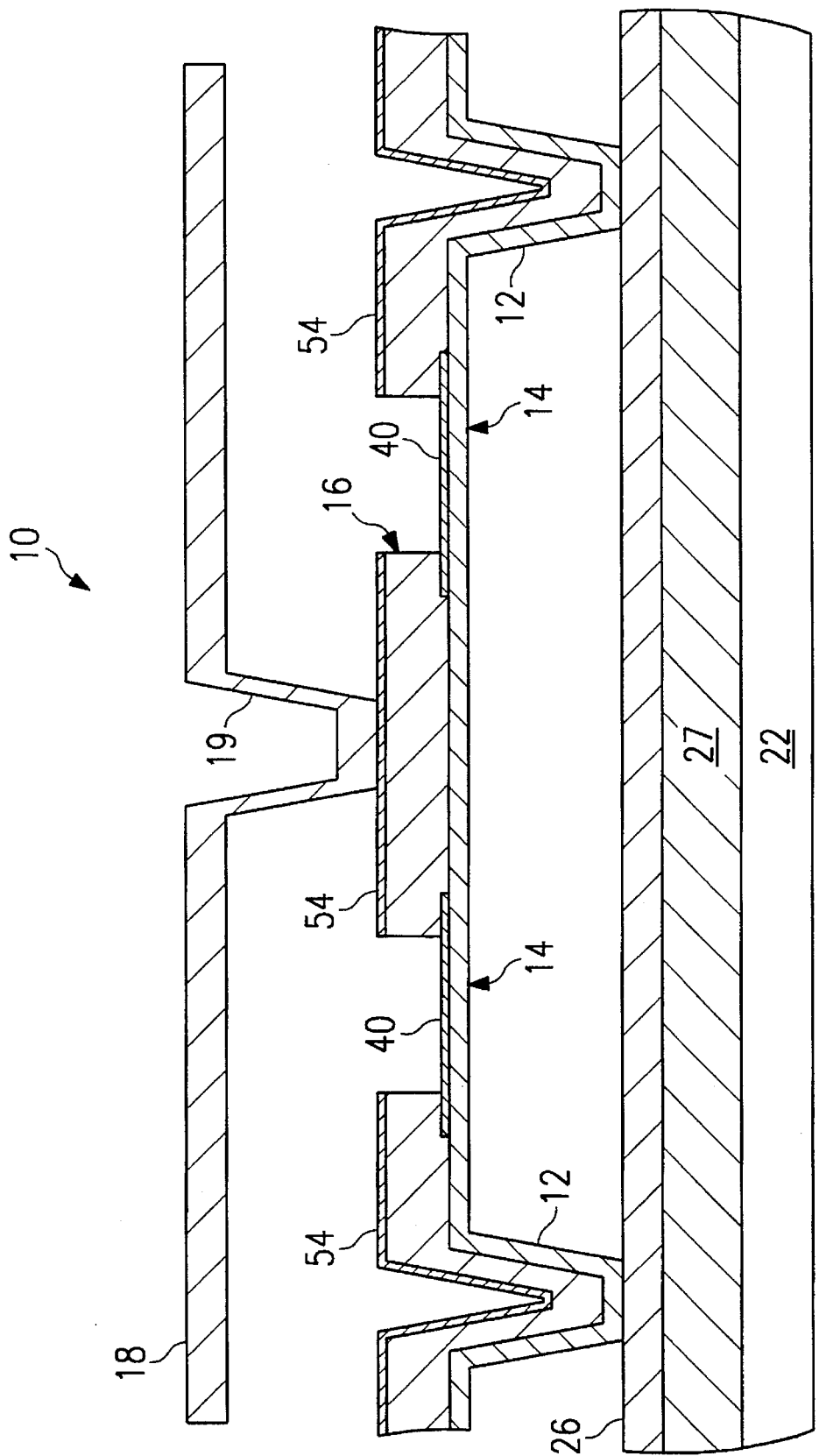

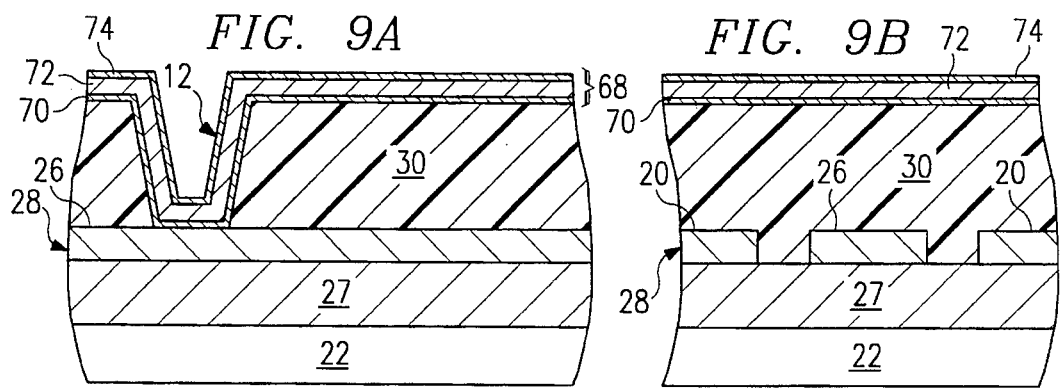
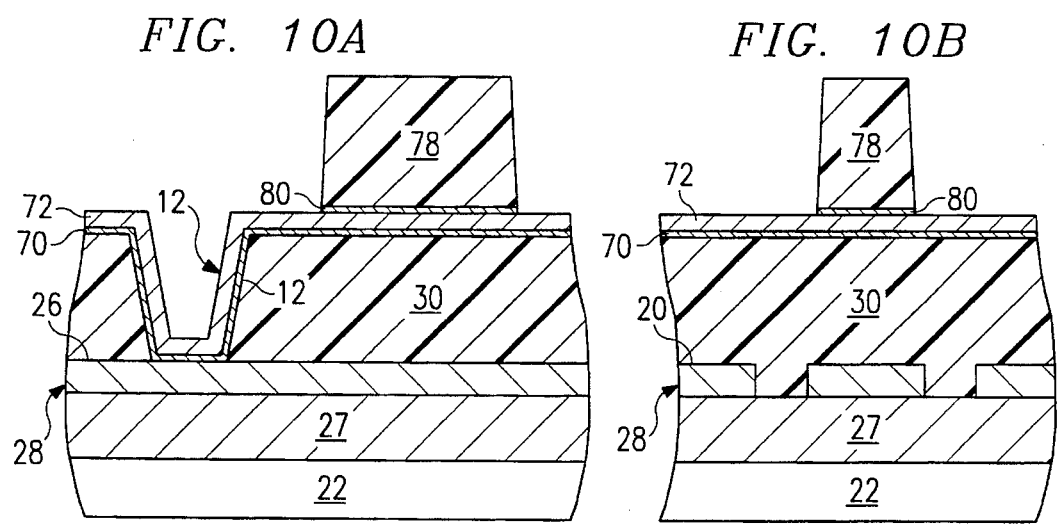
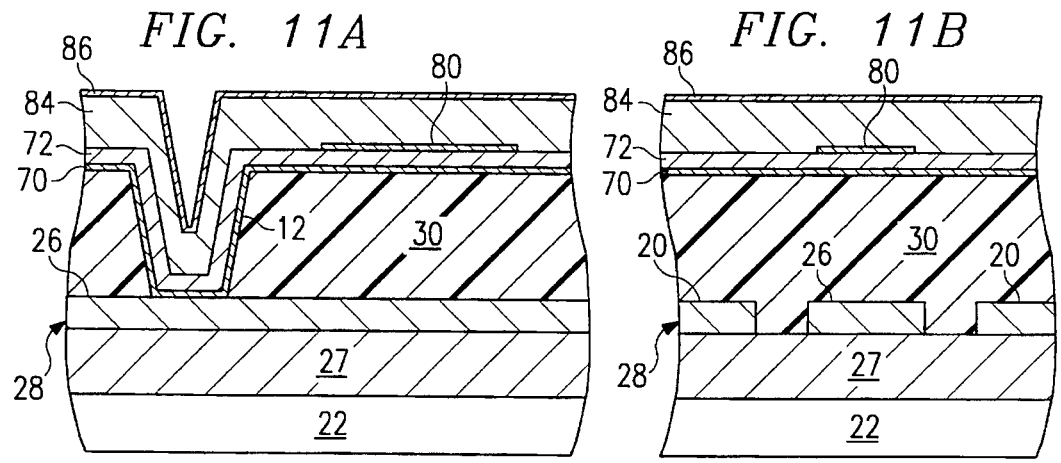

METHOD FOR CREATING A DIGITAL MICROMIRROR DEVICE USING AN ALUMINUM HARD MASK

CROSS REFERENCE TO RELATED APPLICATIONS

Cross reference is made to the following co-pending patent applications the teachings of which are incorporated herein by reference:

| Ser. No. | Title | Date Filed |
| --- | --- | --- |
| 08/268,741 | Improved Hinge for Micro-Mechanical Device | 06/30/94 |
| 08/283,486 | Improved Support Post for Micro-Mechanical Devices | 07/29/94 |
| 08/381,254 | Method for Hardening of Digital Micromirror Device | 01/31/95 |
| 08/395/562 | Micromechanical Device Having an Improved Beam | 02/27/95 |

FIELD OF THE INVENTION

This invention relates generally to a method of fabricating a semiconductor device such as a spatial light modulator (SLM), and more particularly, to an improved method for fabricating a titanium tungsten (TiW) DMD superstructure without using a sacrificial oxide mask.

BACKGROUND OF THE INVENTION

Spatial Light Modulators are widely used in xerographic printers, video monitors, and projection TV's. These SLM's are typically comprised of a linear or area array of pixels. The pixels modulate incident light to form an optical image which exposes a photoreceptor drum in the case of a printer, and which modulated light illuminates a projection screen in the case of a video monitor or backscreen projector.

One type of micro-mechanical spatial light modulator is the digital micromirror device (DMD), also known as a deformable mirror device, manufactured by Texas Instruments Incorporated of Dallas Tex. The DMD is a single monolithic integrated circuit including an area or linear array of hundreds or thousands of microsized bistable tilting mirrors. Light incident on each mirror of the DMD pixel mirror array is selectively reflected either towards or away from an image plane to form light images. Each mirror is pivotably attached to at least one support post via one or more hinges. The mirror is spaced above underlying control circuitry comprising addressing electrodes, these addressing electrodes providing electrostatic forces to cause the mirror to selectively tilt downward in one direction or the other, reflecting incident light one of two directions.

For more detailed background of the implementation of a DMD in a video display or projection T.V., cross reference is made to U.S. Pat. No. 5,206,629 to DeMond, et al entitled "Spatial Light Modulator and Memory for Digitized Video Display", and U.S. Pat. No. 5,096,279 to Hornbeck, et al, entitled "Spatial Light Modulator and Method", both these patents being assigned to the same assignee as the present invention, and the teachings incorporated herein by reference. For additional discussion of implementing a DMD in an electrostatic printer, cross reference is made to U.S. Pat. No. 5,101,236, to Nelson. et al, entitled "Light Energy Control System and Method of Operation", this patent being assigned to the same assignee as the present invention, and the teachings incorporated herein by reference.

DMD's have various designs, each pixel of which include the fabrication of at least one support post, at least one hinge, a beam, and in some cases, an elevated reflective layer fabricated upon the beam. Fabrication of these various structural elements have been accomplished with various semiconductor processing approaches. These approaches require various steps including sequentially depositing material layers one at a time, and patterning these layers using various masking and etching techniques. To establish these patterns, masking layers, such as sacrificial oxide masks, are sometimes used. The use of particular masks have various advantages and disadvantages, and contribute to the overall device complexity, uniformity, and yield level of the DMD device during fabrication. An example of one such fabrication process implementing a sacrificial oxide mask is disclosed in the cross referenced pending patent application entitled "Improved Hinge for Micromechanical Device", Ser. No. 08/268,741, filed Jun. 30, 1994, the teachings of which are included herein by reference.

The use of a sacrificial oxide hard mask to transfer a pattern to metal layers is primarily used to fabricate the DMD. The sacrificial oxide hard mask is a robust process, and is well suited for etching metal films on organic substrates. However, the sacrificial oxide hard mask has associated problems as well, including poor conformal metal deposition control after mask formation resulting in structural weaknesses where the beam metal is deposited over the hinge oxide mask. In addition, the oxide mask is patterned using a positive photoresist, this photoresist being selectively removed after oxide etch through an ash process and leaving an etch residue. Finally, there is the requirement of an oxide strip to remove the sacrificial oxide mask when used to form a hinge and beam in the DMD devices. The hinge can be damaged during the oxide strip if selectivity to the hinge material is low.

In the prior art, the DMD superstructure, namely, the support post, hinges and beam are typically comprised of aluminum or an aluminum alloy. Aluminum is a material well suited for fabricating the DMD due to its amenability to processing, and its high optical reflectivity.

In advancing the state of the art for manufacturing DMD's, it is desired to provide the DMD with a mechanically stronger superstructure. Moreover, it is desired to provide a simpler process than that currently used to fabricate the aluminum and aluminum alloy DMD, which implements a sacrificial oxide hard mask. These and other goals are achieved by the present invention.

SUMMARY OF THE INVENTION

The present invention achieves technical advantages by manufacturing the DMD with a titanium tungsten (TiW) superstructure. In addition, the semiconductor process for fabricating this TiW superstructure is achieved by using an aluminum hard mask, not by using an oxide hard mask. The present process is simpler than some prior art processes, creates a mechanically strong DMD, and has few associated processing problems since aluminum as a mask is amenable to processing.

The method of the present invention comprises performing several processing steps to define a titanium tungsten hinge and beam for the DMD, also known as the superstructure. To pattern the hinge and beam, thin layers of aluminum are patterned while developing a positive photoresist. During the pattern develop step, the aluminum hard mask is etched by the developer into the required pattern due to its solubility. Both the titanium tungsten hinges and beam comprising the superstructure are formed by etching away the exposed titanium tungsten material with a fluorinated plasma. The aluminum hard mask does not need to be removed, and can be left in place.

One method of fabricating a spatial light modulator, such as the DMD, comprises the steps of first forming an electrical addressing circuitry on a substrate. Next, a photoresist spacer layer is deposited on the substrate and over the addressing circuitry, and preferably includes a pair of vias. Thereafter, a hinge layer comprised of titanium tungsten is sputter deposited over this spacer layer and into the photoresist vias to form a pair of metal support posts. Then, a first aluminum metal layer is applied and patterned to define an aluminum mask for hinge formation. This aluminum hinge mask is formed simultaneously while developing a positive photoresist due to aluminum's solubility. Next, a beam layer of titanium tungsten is deposited over this hinge metal layer and buries the aluminum hinge mask.

After these layers have been deposited, a second aluminum layer is applied and patterned to define the beam aluminum hard mask. Next, exposed portions of the titanium tungsten beam layer are etched away, preferably using a fluorinated plasma. The aluminum beam mask forms the beam during this etching process. Also, during this etching process, the fluorinated plasma etches the titanium tungsten hinge layer, except where masked by the buried aluminum hard hinge mask which provides an etch stop and thus forms the hinge. Lastly, at least a portion of the spacer layer is removed to free the beam from the spacer layer.

In this embodiment, an aluminum hard mask is used to define both the beam and the hinge. Essentially, the titanium tungsten hinge layer and aluminum hinge mask are buried while forming the titanium tungsten beam, and are later exposed when etching away the unwanted titanium tungsten of the beam layer and hinge layer. This process is rather simple, requires few steps, and importantly, eliminates the use of a sacrificial oxide hard mask for defining the hinge and beams. The aluminum hard masks used to defined the hinge and beam patterns are formed using a conventional photolighography techniques. During the develop step, the aluminum not protected by the photoresist mask is dissolved by the developer solution. A subsequent ash removes the photoresist and leaves the aluminum mask.

In an alternative preferred embodiment of the present invention, a modified process utilizes a multilayered hinge layer to prevent the fluorinated plasma used to etch the TiW from exposing and fluorinating the spacer layer. The method according to the first preferred embodiment is modified in that the hinge layer is formed by first depositing 100 angstroms of aluminum, then 400 to 500 angstroms of titanium tungsten, and then with another 100 angstroms of aluminum. Thereafter, positive photoresist is applied to the thin upper aluminum layer of the hinge layer, and patterned. The exposed portion of the upper aluminum hinge layer is simultaneously removed during the pattern develop step due to its solubility, thus defining a thin aluminum hinge mask. Thereafter, the photoresist is stripped.

Next, a beam layer comprising of titanium tungsten is deposited, such as using convention sputtering techniques, to bury this defined thin aluminum hinge mask. The titanium tungsten beam layer is preferably 3,000 angstroms in thickness. Next, a thin top layer of aluminum having a thickness of 100 angstroms is deposited thereover.

Now, a positive photoresist is applied to this thin upper aluminum layer, and exposed to define a beam pattern. The exposed aluminum layer is etched away during the photoresist beam pattern develop step to define an aluminum hard beam mask, and then the photoresist is stripped. Next, the exposed titanium tungsten beam layer and buried hinge layer are etched away with a fluorinated plasma, whereby the aluminum hard beam mask defines the beam and the aluminum hard hinge mask defines the hinges. The thin aluminum hinge mask acts as a etch stop over the hinge, and the lower aluminum layer as an etch stop over the spacer layer, and prevents the spacer layer from becoming exposed to the fluorinated plasma.

Lastly, a final developer treatment is performed to remove the exposed bottom hinge aluminum layer. The spacer layer is then removed by an ash process to free the beam from this layer.

This alternative preferred embodiment requires a couple of additional steps compared the process of the first embodiment, however, a sacrificial oxide mask is still avoided, and in addition, the spacer layer, usually being comprised of photoresist, is never exposed to the florinated plasma.

Using aluminum as a thin hard mask has many benefits including the fact that there is no etch residue associated with defining the aluminum hard mask, and aluminum is amenable to processing. Aluminum is easy to deposit using conventional sputtering techniques, and is soluble in positive developer. Other desirable features of aluminum as a hard mask include resistance to fluorinated plasmas, no need to strip the mask due to it being electrically conductive, and elimination of hinge mask topography during beam deposition.

BRIEF DESCRIPTION OF THE DRAWINGS

FIG. 1 is a perspective view of a DMD superstructure fabricated using the method according to the preferred embodiment of the present invention;

FIG. 2A and FIG. 2B are a cross section taken along, line A–A' and line B–B' of FIG. 1, respectively, illustrating a thin metal mask layer being deposited upon the hinge layer;

FIG. 3A and FIG. 3B illustrate the thin metal mask layer coated with a patterned layer of photoresist after an etching process to define a thin aluminum hard hinge mask;

FIG. 4A and FIG. 4B illustrate a titatium tungsten beam layer deposited over the first aluminum mask layer, with a second thin layer of aluminum being deposited over the beam layer;

FIG. 8 is a view taken along line A–A" of FIG. 1, whereby the spacer layers are undercut to free the hinges and beam, with the mirror being supported upon the beam;

FIG. 9A and FIG. 9B illustrate a titanium tungsten hinge layer and a middle thin hinge layer of aluminium being deposited over a lower aluminum layer;

FIG. 10A and FIG. 10B illustrate using a photoresist develop process to form a thin aluminum hard hinge mask;

FIG. 11A and FIG. 11B illustrate a titanium tungsten beam layer and a thin top layer of aluminum being deposited;

DETAIL DESCRIPTION OF THE PREFERRED EMBODIMENT

Figure 5A:
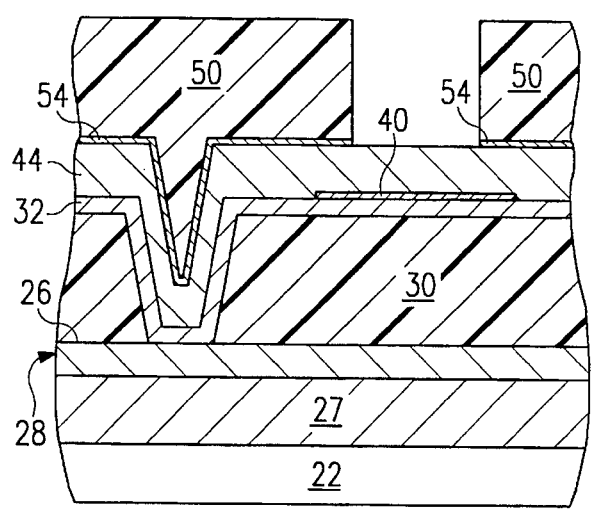
FIG. 5A and FIG. 5B illustrate a photoresist mask defining a beam pattern after an etch process to define an aluminum hard beam mask.

Turning first to FIG. 1 a brief overview of a typical DMD device 10 used as a spatial light modulator is shown. DMD 10 is shown to include a pair of metal support posts 12 with a titanium tungsten hinge 14 cantilevered from each post 12 and connected to a supported beam 16. Beam 16 supports an elevated pixel mirror 18 via support 19 which are also comprised of titanium tungsten, and may have an upper reflective layer of aluminum. Pixel mirror 18 is rotatably controlled by a pair of opposing underlying address electrode pads 20 and elevated electrodes 21, these electrodes and pads in turn being connected to and electrostatically charged by an underlying SRAM memory cell (not shown) formed upon a substrate 22.

Pixel mirror 18 is bistable, that is, axially rotatable about hinges 14 to one of two stable positions to reflect incident light one of two directions. When rotated, two tips of the beam 16 land upon a pair of fingers of respective landing bias pad 26. A bias on the pads 20 induce an electrostatic force on beam 16, and a bias on electrodes 21 induce an electrostatic force on pixel mirror 18. The superstructure of DMD 10 comprises of titanium tungsten hinges 14 and beam 16. The mirror pixel is comprised of either titanium tungsten or aluminum. For a more detailed discussion of the DMD as a spatial light modulator, cross reference is made to U.S. Pat. No. 5,061,049 to Hornbeck, entitled "Spatial Light Modulator and Method", assigned to the same assignee as the present invention, and the teachings of which are included herein by reference.

Turning now to FIGS. 2–8, a detailed discussion of the method for forming DMD 10 according to the preferred embodiment of the present invention will be provided, whereby the superstructure of DMD 10, namely, the hinges 14, beam 16 and pixel mirror 18, are comprised of titanium tungsten. Compared to aluminum, titanium tungsten is a much harder material, and exhibits less creep properties. The particular "A" and "B" view of each of FIGS. 2–6 is taken along lines A–A' and B–B' of FIG. 1 at 90° to the plane of the superstructure, with these two views of each step being provided for purposes of clarity.

First, referring to FIG. 2a and FIG. 2b, a silicon dioxide insulating layer 27 is deposited over the processed silicon substrate 22 including the SRAM memory cell (not shown), as depicted in FIG. 1. Thereafter, a metal layer 28 is sputter deposited and patterned to define electrodes 20 and bias pads 26, these electrodes being connected by vias to the substrate addressing circuitry including the SRAM cell. Next, a pair of metal superstructure support posts 12 are formed on pads 26. The formation of posts 12 involves sputter depositing a thin titanium tungsten hinge layer 32 in vias of a patterned organic spacer layer 30, typically comprised of positive photoresist, deposited upon metal layer 28. Hinge layer 32 has a thickness of about 500 Angstroms, and spacer layer 30 is preferably 0.5 to 2.0 micron, deep UV hardened to a temperature of 200 degrees centigrade to prevent distortion of the post pattern through reflow and photoresist bubbling and reticulation during subsequent processing steps.

Next, a thin metal mask layer 34, preferably comprised of aluminum, is deposited upon hinge layer 32 using conventional sputtering techniques. This aluminum mask layer 34 preferably has a thickness of only 100 angstroms. Now, referring to FIG. 3A and FIG. 3B, aluminum mask layer 34 is coated with photoresist, exposed and developed using conventional photolithography techniques to form a hinge pattern 36. The exposed aluminum mask layer 34 is etched during the photoresist pattern develop process due to its solubility in positive developer. Exposed areas of the aluminum are etched away, with the titanium tungsten hinge layer 32 providing an etch stop, as shown. This leaves behind a thin aluminum hard hinge mask forming a hinge pattern, shown at 40. This aluminum hard hinge mask 40 will ultimately be used to define the titanium tungsten hinges 14 in the hinge layer 32, as will be discussed shortly. Next, the photoresist pattern 36 is removed with an ash process.

Now referring to FIG. 4a and FIG. 4b, a beam metal layer of titanium tungsten 44 is sputter deposited over and buries titanium tungsten hinge layer 32 and aluminum hard hinge mask 40. This titanium tungsten beam layer 44 preferably has a thickness of about 3,000 angstroms. Because mask 40 is so thin, good conformal coating is achieved with layer 44. Next, a thin metal layer of aluminum 46 is sputter deposited upon titanium tungsten beam layer 44, as shown. Aluminum layer 46 preferably has a thickness of 100 angstroms.

Figure 5B:
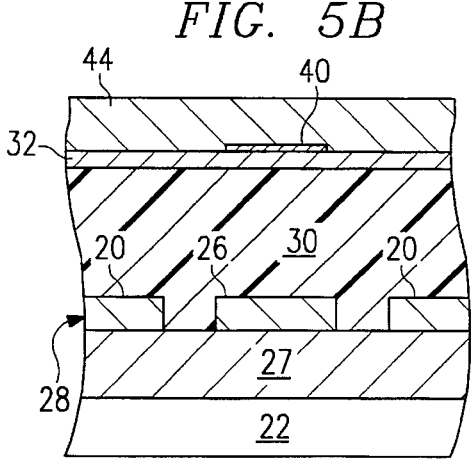

Referring now to FIG. 5a and FIG. 5b, a layer of positive photoresist is deposited upon aluminum layer 46, exposed and developed using conventional photolithography techniques to define a photoresist beam mask shown at 50. Photoresist mask 50 defines a beam pattern which is transferred to metal layer 46, whereby the exposed portions of aluminum layer 46 are etched away during the photoresist develop process due to its solubility in positive photoresist, as shown. Thereafter, photoresist beam pattern 50 is stripped with an ash process. This leaves behind an aluminum hard beam mask 54, as shown.

Figure 6A:
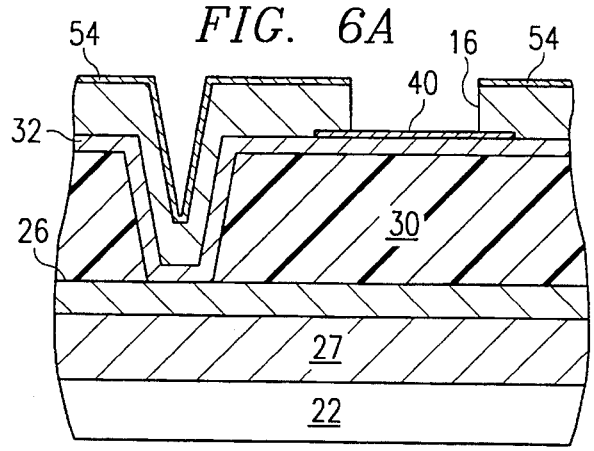
FIG. 6A and FIG. 6B illustrate the defined beam after the titanium tungsten beam layer is etched away.
Figure 6B:
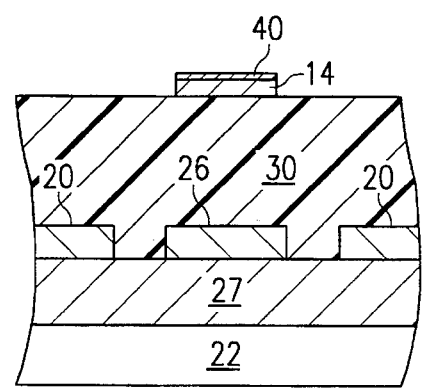

Turning now to FIG. 6a and FIG. 6b, with the thin aluminum hard mask 54 defining a beam pattern, the exposed portion of the titanium tungsten beam layer 44 is etched away with a fluorinated plasma, preferably, $SF_6$. The exposed titanium tungsten beam layer 44 is etched away to define beam 16 as shown in FIG. 6a, as is the unmasked titanium tungsten hinge layer 32 with the thin first aluminum hard hinge mask 40 acting as a etch stop to define hinge 14, as shown in FIG. 6b.

Figure 7:
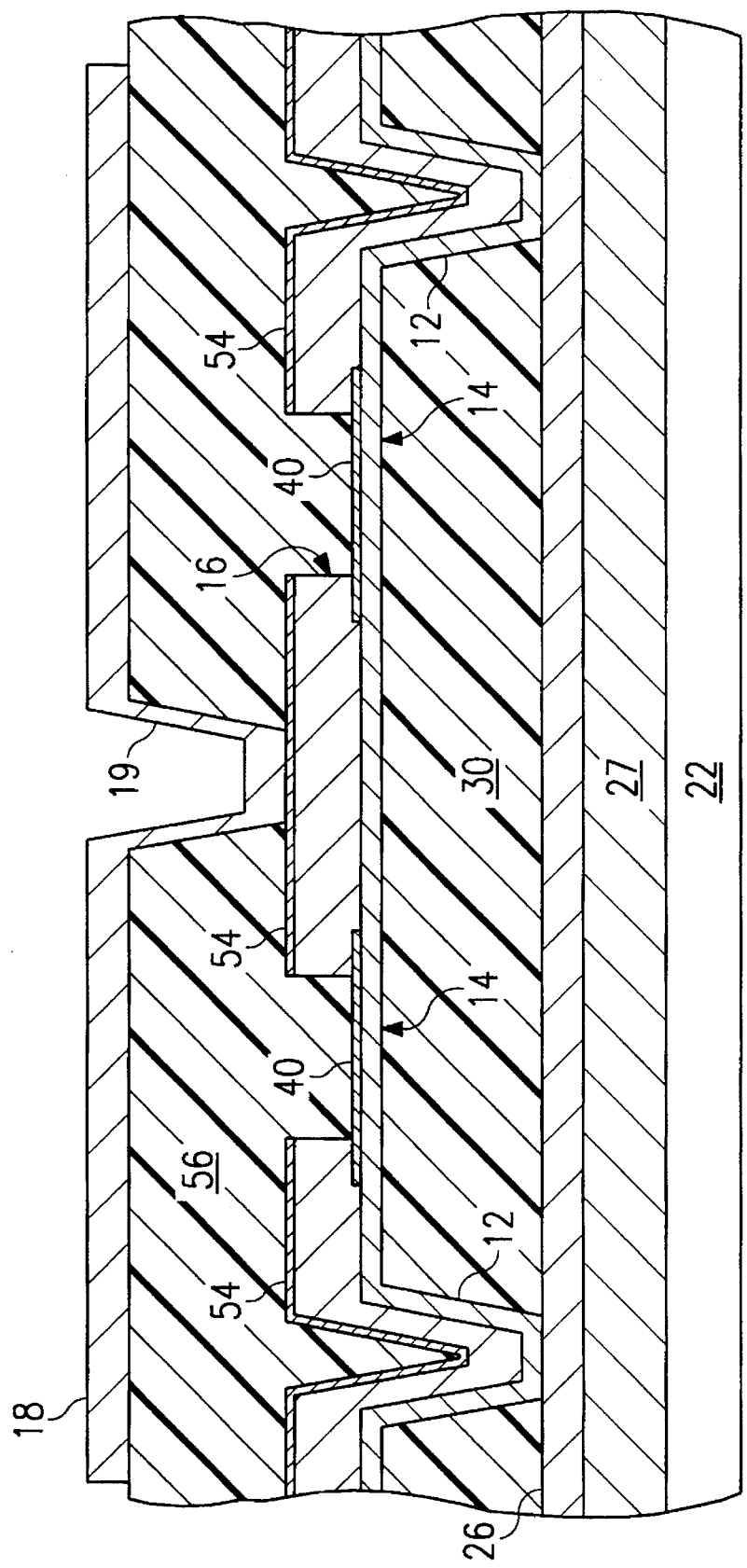
FIG. 7 is a cross section taken along line A–A" of FIG. 1, whereby a photoresist layer and then a mirror layer are deposited.

Turning to FIG. 7 which is a cross section along line A–A" of FIG. 1, a second spacer layer of positive photoresist 5b is deposited over the structure of FIG. 6a and FIG. 6b. A mirror is formed by sputter depositing a layer of metal onto photoresist layer 56, such as titanium tungsten, aluminum, aluminum alloy, or other reflective metals, with the support post 19 being formed in a via defined in photoresist 56, and patterning to define mirror 18. This elevated mirror structure is disclosed in U.S. Pat. No. 5,083,857 entitled "Multi-level Deformable Mirror Device", assigned to the same assignee as the present invention and the teachings incorporated herein by reference. Thereafter, as shown in FIG. 8, also taken along line A–A" of FIG. 1, spacer layer 30 and 56 are undercut and removed with a conventional ash process, freeing the titanium hinges 14 and titanium tungsten beam 16 from the spacer layer 30 such that they are spaced over substrate 22 and the addressing circuitry 20, and freeing mirror 18, as shown in FIG. 1.

One technical advantage of the process according to the preferred embodiment of the invention is that a pair of thin aluminum hard masks are implemented to define the hinge and beam structure. There is no use of a sacrificial oxide hard mask. In addition, there are relatively few process steps required, with the aluminum masks being formed in a single step when developing the photoresist. As shown in FIG. 8, the hinge 14 and beam 16 of the DMD device 10 is comprised entirely of titanium tungsten. Moreover, the beam and hinge superstructure is generally coplanar, even at the interface of the hinges 14 and beam 16 since there is good conformal coating over the thin aluminum masks during processing.

Turning now to FIGS. 9–16, a detailed discussion of a semiconductor processing procedure according to an alternative preferred embodiment of the present invention will be discussed to form a DMD 66. In this embodiment, the photoresist spacer layer 30 is never exposed to the fluorinated plasma used to etch back the titanium tungsten superstructure. In addition, a sacrificial oxide mask is still avoided, whereby only thin aluminum hard masks are implemented, similar to that discussed in the first preferred embodiment.

First turning to FIG. 9a and FIG. 9b, the silicon dioxide insulating layer 27 and metal layer 28 are formed over substrate 22 including the SRAM cells to define bias pads 26 and electrode pads 20, as previously described. Then, metal support posts 12 are formed in vias of spacer layer 30 while sequentially depositing a multi-layer hinge layer 68 over spacer layer 30. This metal hinge layer 68 comprises of a thin sputter deposited first and lower layer 70 of aluminum, having a thickness of about 100 angstroms. Thereafter, a layer of titanium tungsten 72 is sputter deposited over this first aluminum layer 70, and having a thickness of about 400 to 500 angstroms. Finally, a thin upper hinge layer of aluminum 74 is sputter deposited over layer 72, having a thickness of about 100 angstroms. The lower most aluminum layer 70 will ultimately act as an etch stop when the titanium tungsten layer 72 is etched with a fluorinated plasma, as will be discussed shortly.

Turning to FIG. 10a and FIG. 10b, a positive photoresist layer is deposited, exposed and developed to form a hinge pattern 78 in the photoresist and an aluminum mask 80 from layer 74. This alumninum hinge mask 80 is accomplished during the photoresist develop process in which the aluminum layer in the exposed regions of photoresist is dissolved with the middle hinge layer of titanium tungsten 72 acting as an etch stop. Thereafter, the photoresist pattern 78 is removed with an ash process. This leaves behind the thin aluminum hard hinge mask shown at 80.

Turning now to FIG. 11a and FIG. 11b, a beam metal layer 84 comprised of titanium tungsten is deposited over and buries the titanium tungsten hinge layer 72 and aluminum hinge mask 80. Because aluminum hinge mask 80 is so thin, good conformal coating of metal beam layer 84 is achieved. Next, a thin top layer of aluminum 86 is sputter deposited over this titanium tungsten beam layer 84. Titanium tungsten beam layer 84 has a thickness of about 3,000 angstroms, and thin top aluminum layer 86 preferably has a thickness of 100 angstroms.

Figure 12A:
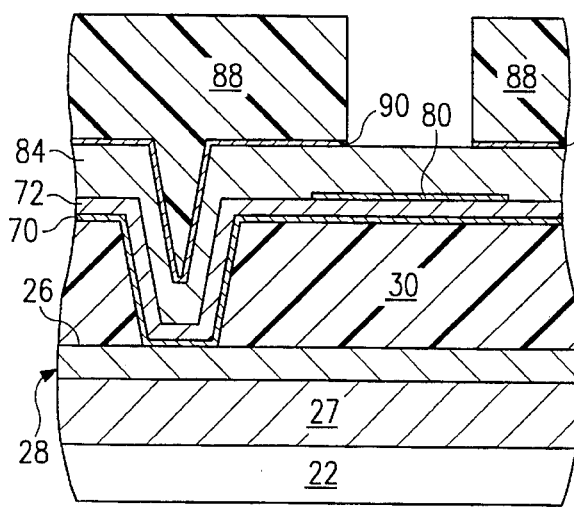
FIG. 12A and FIG. 12B illustrate a layer of photoresist being developed upon the upper thin aluminium layer to leave behind an aluminum hard beam mask.
Figure 12B:
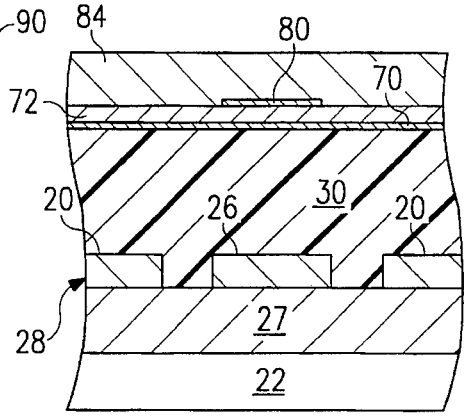

Turning now to FIG. 12a and FIG. 12b, a layer of positive photoresist is deposited upon aluminum layer 86, then exposed and developed using conventional photolithography techniques to form a beam pattern 88 in the photoresist and in aluminum layer 86 to form an aluminum had beam mask 90, with titanium tungsten beam layer 84 providing an etch stop. Next, the photoresist beam mask 88 is removed, leaving behind the aluminum hard beam mask 90.

Figure 13A:
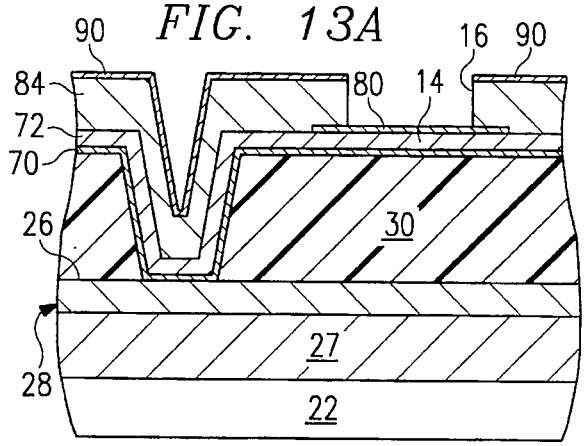
FIG. 13A and FIG. 13B illustrate the beam formed after an etching process.
Figure 13B:
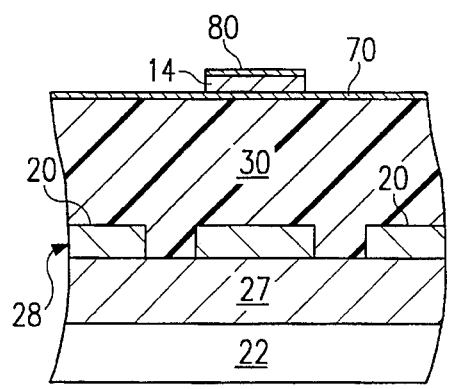

Next, as shown in FIG. 13a and FIG. 13b, the exposed portions of titanium tungsten beam layer 84, as well as unmasked titanium tungsten portions of hinge layer 72, are etched back with a fluorinated plasma, preferably $SF_6$, with the buried aluminum hard hinge mask 80, as well as the lower aluminum hinge layer 70, acting as etch stops. During this step, beam 16 is formed by mask 90, as shown in FIG. 13a, and hinges 14 are formed by mask 80, as shown in FIG. 13b. As can be seen in this step, the photoresist spacer layer 30 is never exposed to the fluorinated plasma.

Figure 14A:
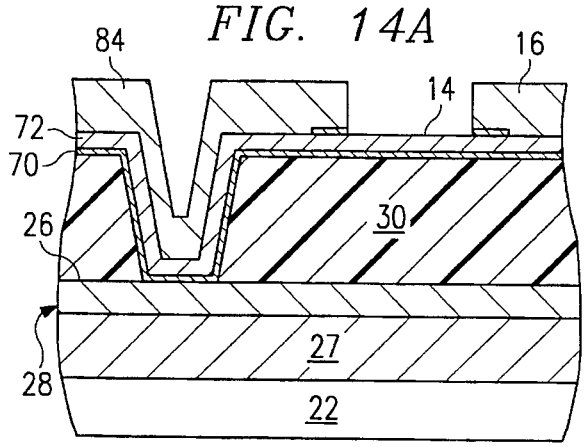
FIG. 14A and FIG. 14B illustrate the removal of the aluminum hinge mask and beam mask.
Figure 14B:
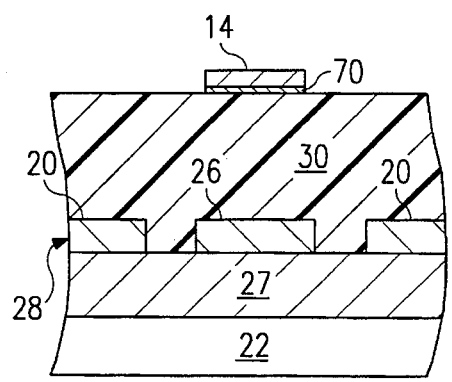

Turning now to FIG. 14a and FIG. 14b, the aluminum hard beam mask 90, as well as the aluminum hard hinge mask 80, are etched back. This step leaves behind the exposed titanium tungsten hinge 14, the titanium tungsten beam 16, and removes etch stop 70 in field regions so spacer 30 can later be removed.

Figure 15:
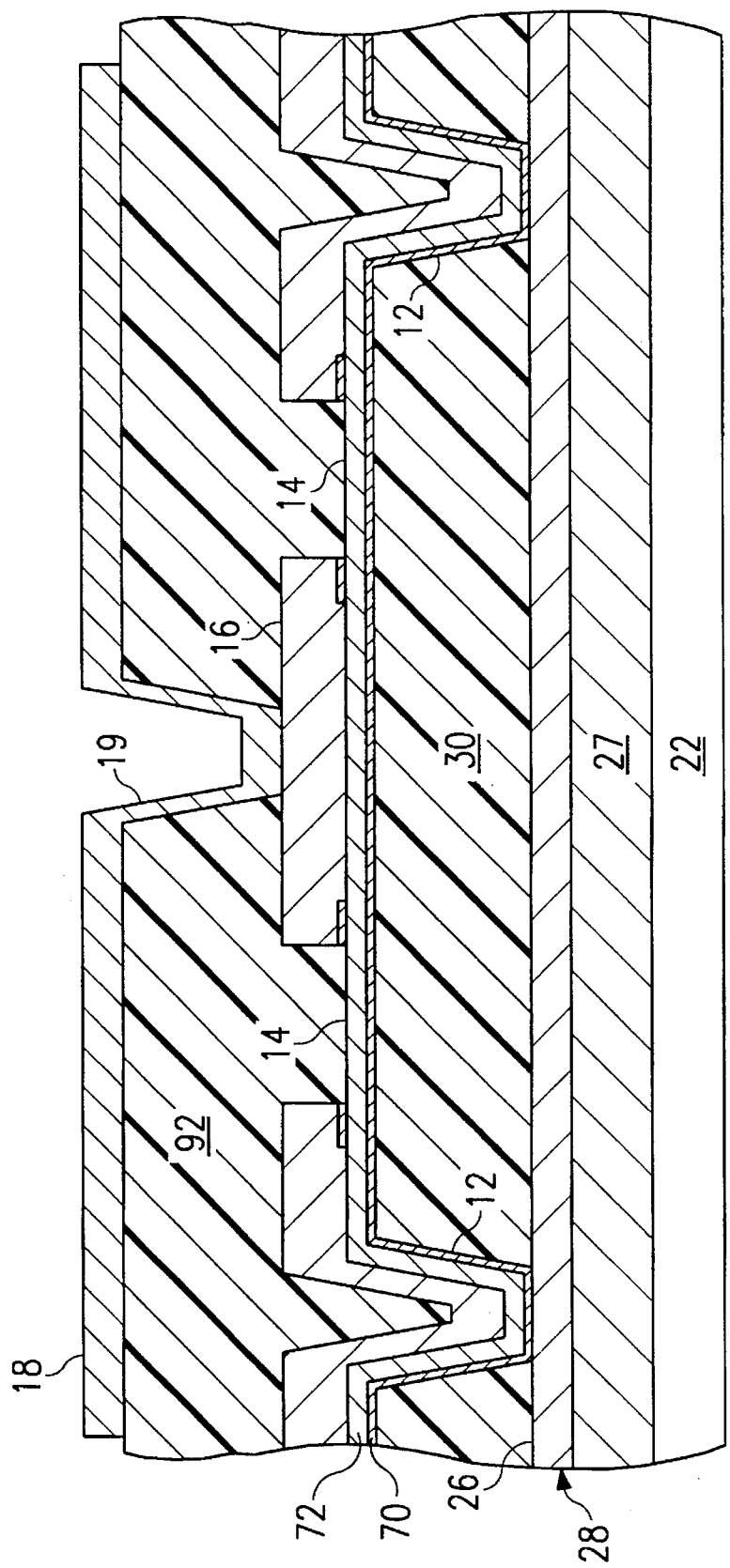
FIG. 15 is a view taken along a line A–A" in FIG. 1 illustrating a deposited layer of photoresist and a layer of reflective metal.
Figure 16:
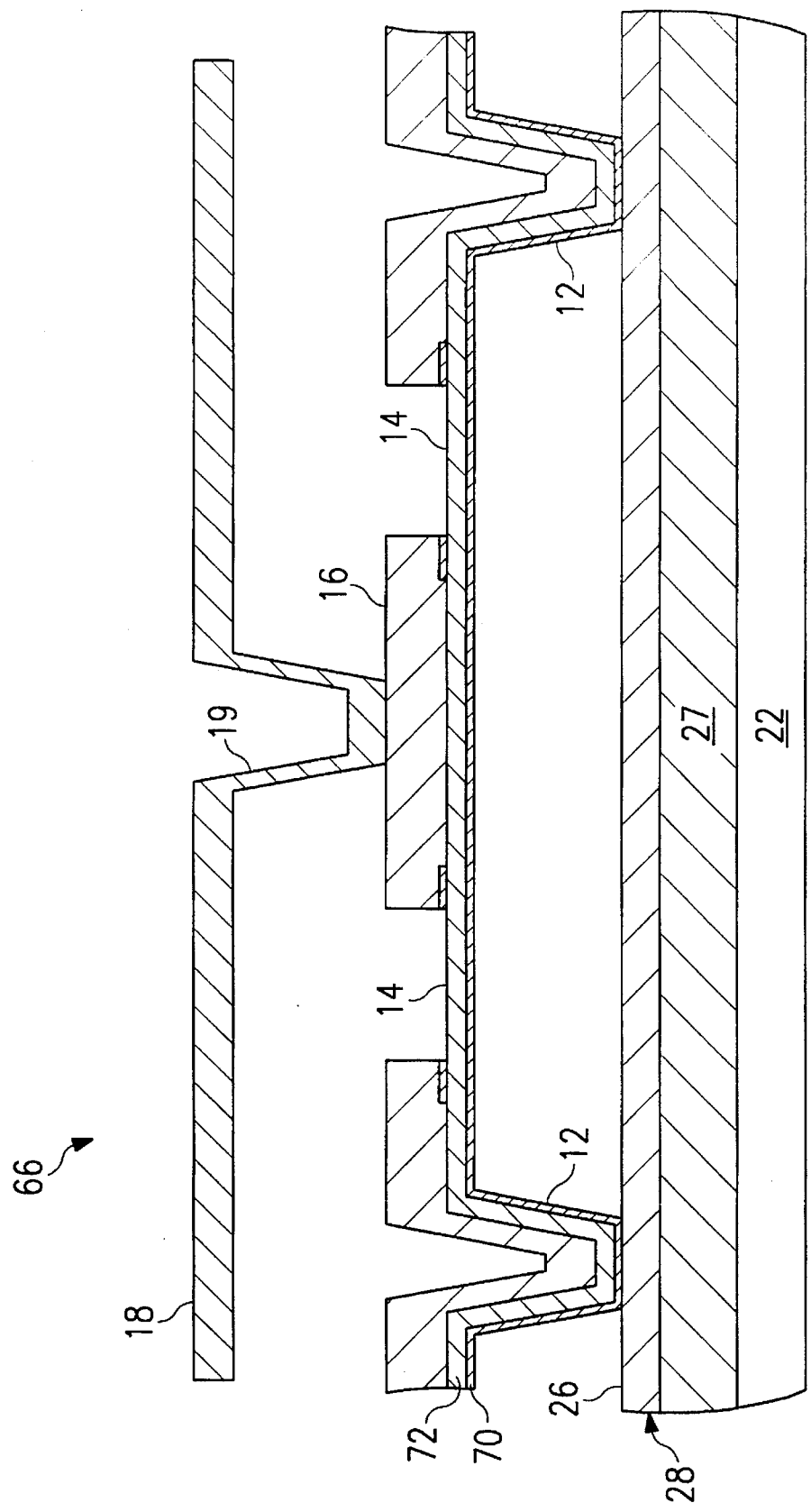
FIG. 16 is a view also taken along a line A–A" in FIG. 1, illustrating the spacer layers being undercut to free the hinge, beam and mirror from the spacer layers.

Turning now to FIG. 15, taken along line A–A" in FIG. 1, a thick layer of photoresist 92 is deposited over the structure of FIG. 14a and FIG. 14b, and patterned to form a via. A layer of titanium tungsten, aluminum, or other reflective metal, is then sputter deposited over photoresist 92, patterned and etched to form mirror 18 with mirror support post 19 forming in the via of photoresist 92. Again, this elevated mirror structure is described in U.S. Pat. No. 5,083,857 entitled "Multi-level Deformable Mirror Device". Lastly, as shown in FIG. 16, also taken along line A–A" in FIG. 1, the spacer layers 30 and 92 are undercut and removed with a conventional ash process to free the hinge 14, the beam 16 and mirror 18 from the spacer layers.

According to the method of the alternative preferred embodiment of the present invention, only a thin aluminum hard beam mask 90 and hinge mask 80 are implemented, these masks being formed in the same step as developing the photoresist due to the solubility of aluminum, and the use of an oxide hard mask and its associated drawbacks are avoided. In addition, the photoresist spacer layer 30 is never exposed to the fluorinated plasma during the etching of the titanium tungsten beam and hinge. Thus, there is no associated residue in the spacer layer, which can be easily ashed away.

According to the methods of the preferred embodiment, an all titanium tungsten hinge and beam of the superstructure is provided. Titanium tungsten is preferred to aluminum in that it is substantially harder, and is less subject to creep and cupping. The mirror can be comprised of either titanium tungsten or aluminum.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, the particular design of the DMD superstructure can be varied from that shown, with the hinge and beam being contoured to provide certain physical and optical attributes. It is also anticipated that additional processing can be performed to provide complex structures, such as those disclosed in the other cross-referenced patent applications and issued patents, and the present invention is well suited for those applications. An elevated mirror is preferred, but not necessary and the beam can be the mirror if desired in some designs.

We claim:

1. A method of fabricating a device, comprising the steps of:
   a) forming electrical addressing circuitry on a substrate;
   b) depositing a spacer layer on said substrate and over said addressing circuitry;
   c) depositing a hinge layer on said spacer layer;
   d) depositing a beam layer on said hinge layer;
   e) defining a beam pattern of a first metal layer on said beam layer;
   f) etching exposed said beam layer with said beam pattern of said first metal layer masking said beam layer to define a beam and hinge; and
   g) removing at least a portion of said spacer layer to free said beam from said spacer layer.

2. The method as specified in claim 1 further comprising the step of masking said hinge layer with a hinge pattern of a second metal layer before depositing said beam layer in said step d), and etching exposed said hinge layer in said step f) not masked by said metal hinge pattern.

3. The method as specified in claim 2 further comprising the step of depositing aluminum as said first and said second metal layers.

4. The method as specified in claim 3 further comprising the step of etching said first and second aluminum metal layers to totally remove said first and said second aluminum metal layers after said step f).

5. The method as specified in claim 1 further comprising the step of utilizing TiW as said hinge layer in said step c).

6. The method as specified in claim 1 further comprising the step of utilizing TiW as said beam layer in said step d).

7. The method as specified in claim 6 further comprising the step of utilizing aluminum as said first metal layer in said step e) to mask said TiW beam layer.

8. The method as specified in claim 3 further comprising the step of defining said hinge pattern by developing photoresist using photolithography techniques.

9. The method as specified in claim 8 further comprising the step of defining said beam pattern by developing photoresist using photolithography techniques.

10. The method as specified in claim 1 further comprising the step of using a fluorinated plasma to etch said exposed beam layer in said step f).

11. A method of fabricating a device, comprising the steps of:
    a) foxing electrical addressing circuitry on a substrate;
    b) depositing a spacer layer on said substrate and over said addressing circuitry;
    c) depositing a hinge layer on said spacer layer;
    d) defining a hinge pattern of a first metal layer on said hinge layer;
    e) etching exposed said hinge layer with said hinge pattern of said first metal layer masking said hinge layer to define a hinge;
    f) forming a beam on said hinge; and
    g) removing at least a portion of said spacer layer to free said beam from said spacer layer.

12. A method of fabricating a device, comprising the steps of:
    a) forming electrical addressing circuitry on a substrate;
    b) depositing a spacer layer on said substrate and over said addressing circuitry;
    c) depositing a hinge layer on said spacer layer;
    d) depositing a first mask layer of metal on said hinge layer, coating said first metal mask layer with photoresist, and developing said photoresist to define a hinge pattern in both said photoresist and said first metal mask layer over said hinge layer;
    e) removing said photoresist hinge pattern;
    f) depositing a beam layer over said metal hinge mask and said hinge layer;
    g) depositing a second mask layer of metal on said beam layer, coating said second metal mask layer with photoresist, and developing said photoresist to define a beam pattern in both said photoresist and said second metal mask layer over said beam layer;
    h) removing said photoresist beam pattern;
    i) etching said beam layer and said hinge layer with said metal beam mask masking said beam layer to define a beam, and to expose said metal hinge mask of said step e); and
    j) removing at least a portion of said spacer layer to free said beam from said spacer layer.

13. The method as specified in claim 12 further comprising the step of utilizing Aluminum as both said first metal mask layer and said second metal mask layer.

14. The method as specified in claim 13 further comprising the step of: etching back said aluminum beam mask and said aluminum hinge mask to totally remove said aluminum hinge mask before performing said step j).

15. The method as specified in claim 13 further comprising the step of providing TiW as both said hinge layer and said beam layer.

16. The method as specified in claim 15 further comprising the step of using a fluorinated plasma to etch said TiW beam layer in said step i).

17. The method as specified in claim 13 further comprising step of using a photolithography process to develop said photoresist and define said metal beam mask and said metal hinge mask in said steps d) and g).

18. The method as specified in claim 15 further comprising the step of defining said TiW hinge layer as approximately 500 Angstroms thick, and defining said first aluminum mask layer as approximately 100 Angstroms thick.

19. A method fabricating a device, comprising the steps of:
    a) forming electrical addressing circuitry on a substrate;
    b) depositing a spacer layer on said substrate and over said addressing circuitry;
    c) depositing a metal hinge layer on said spacer layer comprising a top, middle, and bottom metal layer;
    d) defining a hinge pattern in said top metal layer;
    e) depositing a beam layer on exposed said patterned top and said middle metal hinge layers;
    f) defining a beam pattern of a fourth metal over said beam layer;
    g) etching said beam layer and said middle hinge layer to define a beam with said metal beam pattern providing a metal beam mask, and to define a hinge with said patterned top metal layer providing a metal hinge mask, with said bottom hinge layer providing an etch stop;
    h) removing exposed said bottom hinge layer; and
    i) removing at least a portion of said spacer layer to free said beam from said spacer layer.

20. The method as specified in claim 19 comprising the step of utilizing titanium tungsten material as both said hinge middle metal layer and as said beam layer.

21. The method as specified in claim 20 comprising the step of utilizing aluminum as said top and said bottom hinge metal layers.

22. The method as specified in claim 21 comprising the step of utilizing aluminum as said fourth metal layer.

23. The method as specified in claim 20 comprising the step of utilizing a fluorinated plasma to etch said beam layer and said hinge layer.

24. The method as specified in claim 21 comprising the step of developing a photoresist to define said hinge pattern in said step d).

25. The method as specified in claim 21 comprising the step of developing a photoresist to define said beam pattern in said step f).

26. The method as specified in claim 19 comprising the step of etching back said metal hinge mask after said step g).

27. The method as specified in claim 19 comprising the step of providing said hinge top metal layer with a thickness of about 100 angstroms.

28. The method as specified in claim 19 comprising the step of providing said hinge middle metal layer with a thickness of about 500 angstroms.

29. The method as specified in claim 28 comprising the step of providing said hinge bottom layer and said top metal layer with a thickness of about 100 angstroms each.

* * * * *